Dec. 20, 1966  J. WARSHAWSKY  3,292,833
ELECTRIC WIRE THREADING APPARATUS WITH SEMI-AUTOMATIC CONTROL
Filed Sept. 1, 1964  4 Sheets-Sheet 1
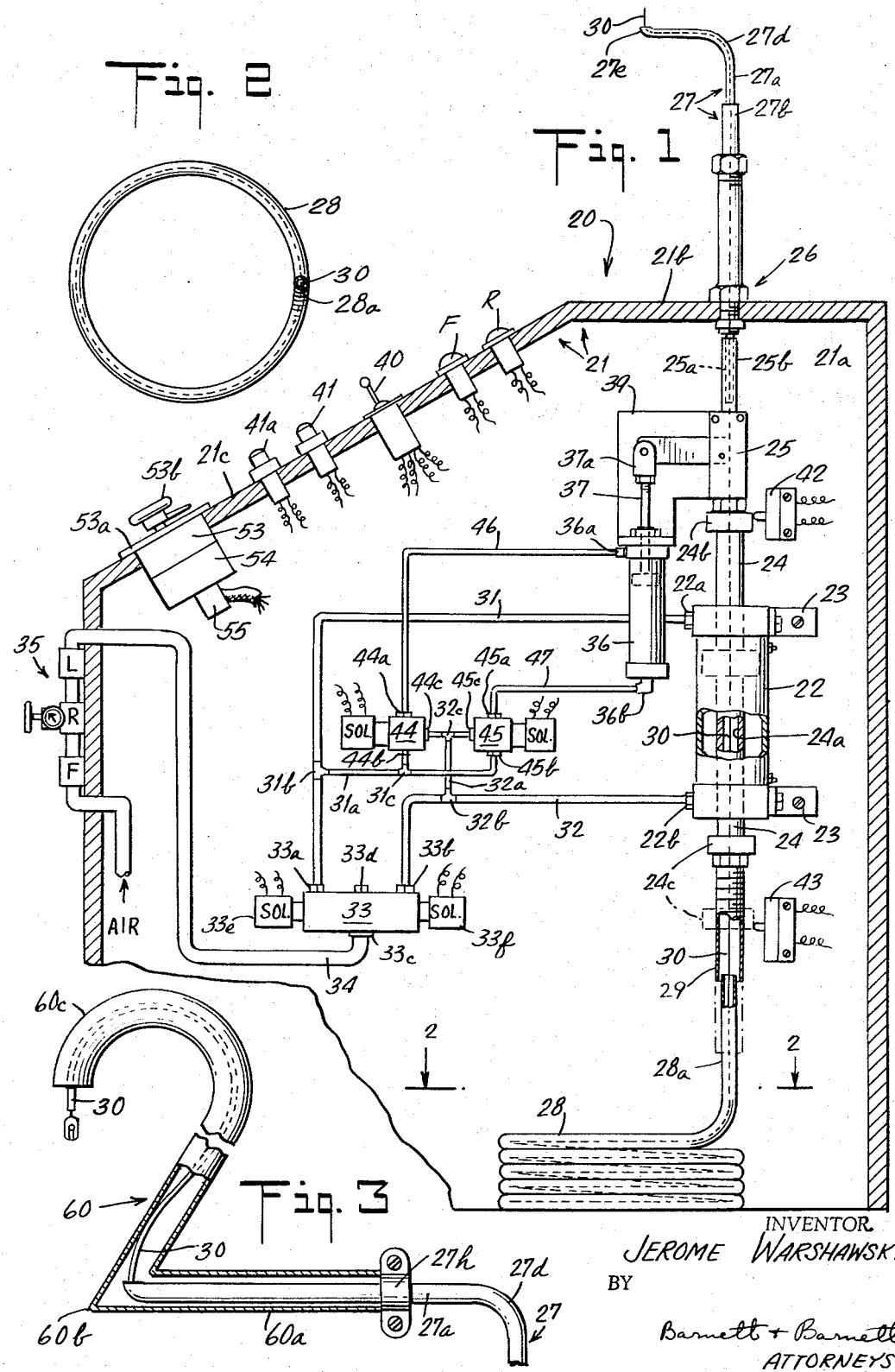
INVENTOR
JEROME WARSHAWSKY
BY
Barnett + Barnett
ATTORNEYS

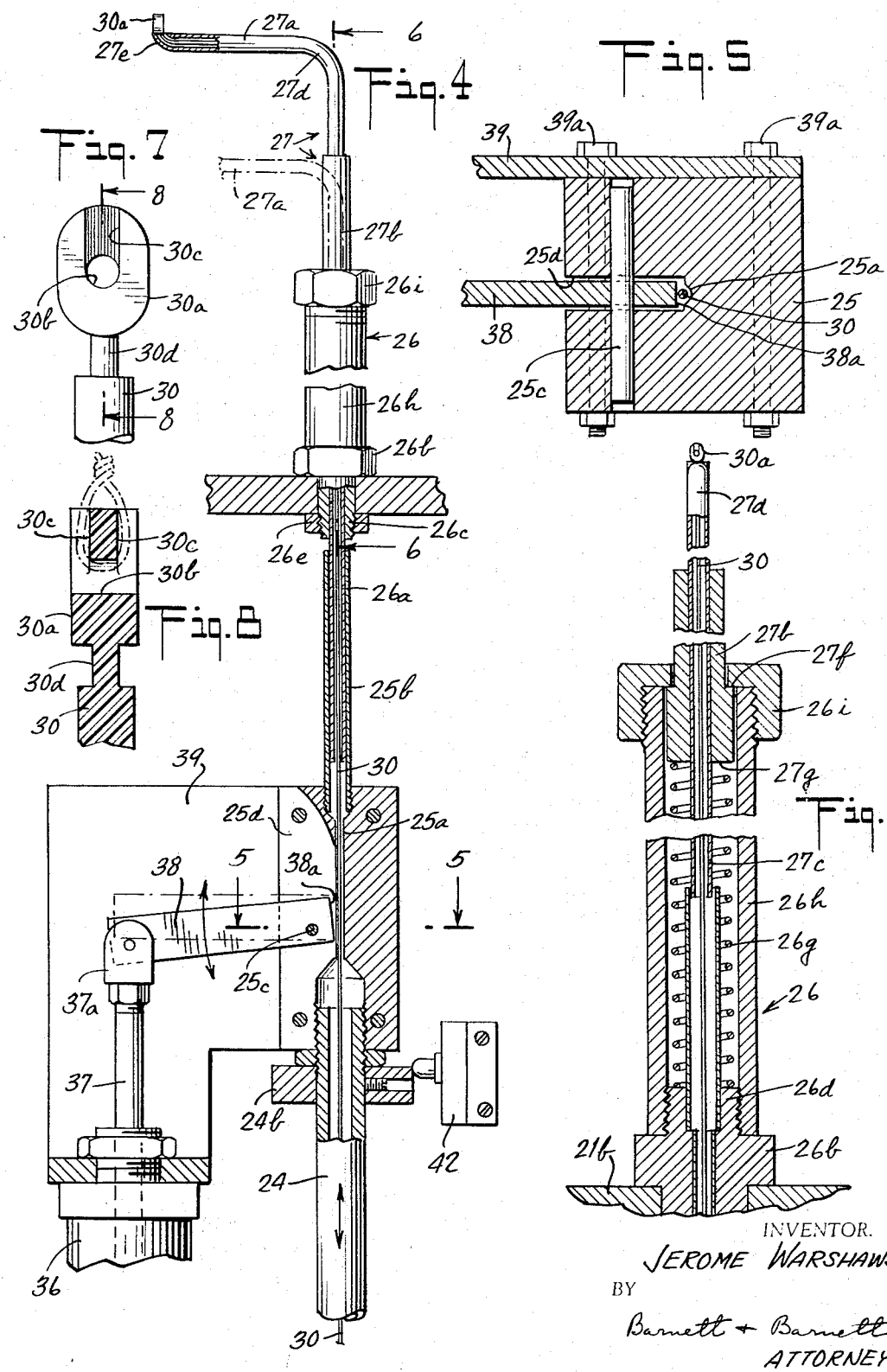

Dec. 20, 1966                J. WARSHAWSKY                3,292,833
ELECTRIC WIRE THREADING APPARATUS WITH SEMI-AUTOMATIC CONTROL
Filed Sept. 1, 1964                                  4 Sheets-Sheet 3

INVENTOR.
JEROME WARSHAWSKY
BY
Barnett + Barnett
ATTORNEYS

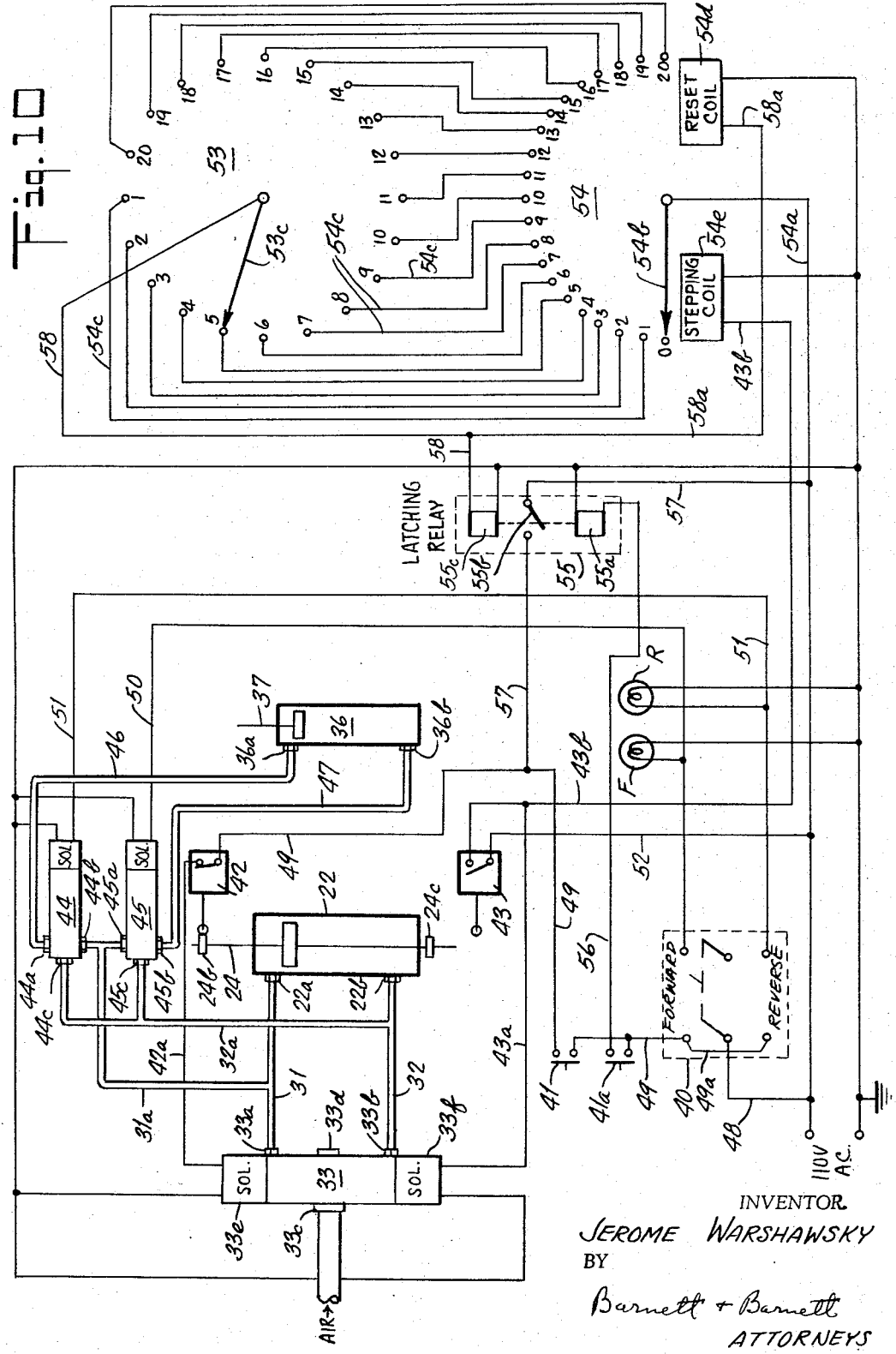

United States Patent Office 3,292,833
Patented Dec. 20, 1966

3,292,833
ELECTRIC WIRE THREADING APPARATUS
WITH SEMI-AUTOMATIC CONTROL
Jerome Warshawsky, 3285 Bertha Drive,
Baldwin, N.Y. 11510
Filed Sept. 1, 1964, Ser. No. 393,597
25 Claims. (Cl. 226—91)

This invention relates to wire threading through hollow conduits and more particularly is directed to semi-automatic apparatus and method for wiring lamps and lighting fixtures.

Among the objects of the invention is to provide a novel apparatus for use by lamp and lighting fixture manufacturers to facilitate the threading or drawing of electric wiring through a wide variety of differently and oddly shaped tubular arms, conduits and the like having sharp and irregular bends as customarily encountered in table and floor lamps and wall and ceiling lighting fixtures, which apparatus shall be capable of directly feeding electric wiring into such conduits or utilize a wire-fish having high tensile strength, abrasion resistance and low surface friction, being relatively bendable yet kink-free to take sharp bends and return to a normal relatively straight line configuration and also being resilient to compression forces to resist permanent cross-sectional deformation by clamping, which apparatus shall advance the electric wiring or wire-fish through the conduit of the lamp in short increments to a predetermined required length to emerge at an opposite conduit end and then, when utilizing the wire-fish, after attachment of electric wiring to the leading end of the wire-fish, shall retract the latter in similar short increments thereby drawing the electric wiring back through the conduit, which apparatus shall include a novel feeding mechanism for effecting in cycles the incremental electric wiring or wire-fish advancement or retraction, which feeding mechanism shall be responsive to manual control or to a dial settable control device for selectively predetermining the length of electric wiring or wire-fish advancement and retraction in the cycle, which feeding mechanism shall be adapted to mount one of a selection of interchangeable nozzles differing from each other in size and configuration and being capable of reaching into the bores of said differently and oddly shaped tubular arms and conduits past any sharp bends and corners of such bores which may be located adjacent an end of the arm and inserting and orienting therein the leading end of the electric wiring or wire-fish to facilitate the threading thereof through the bores, which nozzle shall provide a simple friction drag or brake means for restricting free movement of the electric wiring or wire-fish through the feeding mechanism, which nozzle shall also be provided with a mounting structure incorporating means for limiting further retraction of the wire-fish beyond a predetermined fully retracted position, which apparatus shall be foolproof and easy to operate by semi-skilled labor with a minimum of training, which shall be relatively inexpensive to operate and maintain, and which shall be practical and efficient to a high degree in use.

Other objects of the invention will in part be obvious and in part hereinafter pointed out. The invention accordingly consists of features of construction, combinations of elements and arrangements of parts which will be exemplified in the apparatus hereinafter disclosed, the scope of the application of which will be indicated in the claims following.

In the accompanying drawing, in which various illustrative embodiments of the invention are shown:

FIG. 1 is a vertical sectional view through a housing showing the apparatus constructed to embody the invention.

FIG. 2 is a section taken on line 2—2 in FIG. 1 showing a top view of the coiled receptacle for the wire-fish.

FIG. 3 is an enlarged fragmentary view of the nozzle of the apparatus shown in FIG. 1 inserted into one end of a lamp arm having a sharp bend, the wire-fish being shown emerging from an opposite end.

FIG. 4 is an enlarged view of the feeding mechanism portion of the apparatus shown in FIG. 1 with parts being shown in section.

FIG. 5 is an enlarged sectional view taken on line 5—5 in FIG. 4 showing details of the mechanism for clamping the wire-fish for advancement or retraction.

FIG. 6 is an enlarged sectional view taken on line 6—6 in FIG. 4 showing details of the mounting structure for interchangeable nozzles and the means for limiting further retraction of the wire-fish beyond a fully retracted position.

FIG. 7 is an enlarged detail view of a guiding head for the leading end of the wire-fish.

FIG. 8 is a sectional view taken on line 8—8 in FIG. 7 and showing in broken lines attachment of an electric wire for drawing back through a conduit.

FIG. 10 is a wiring diagram of the electrical system for semi-automatic control of the apparatus shown in FIG. 1.

Figure 9:
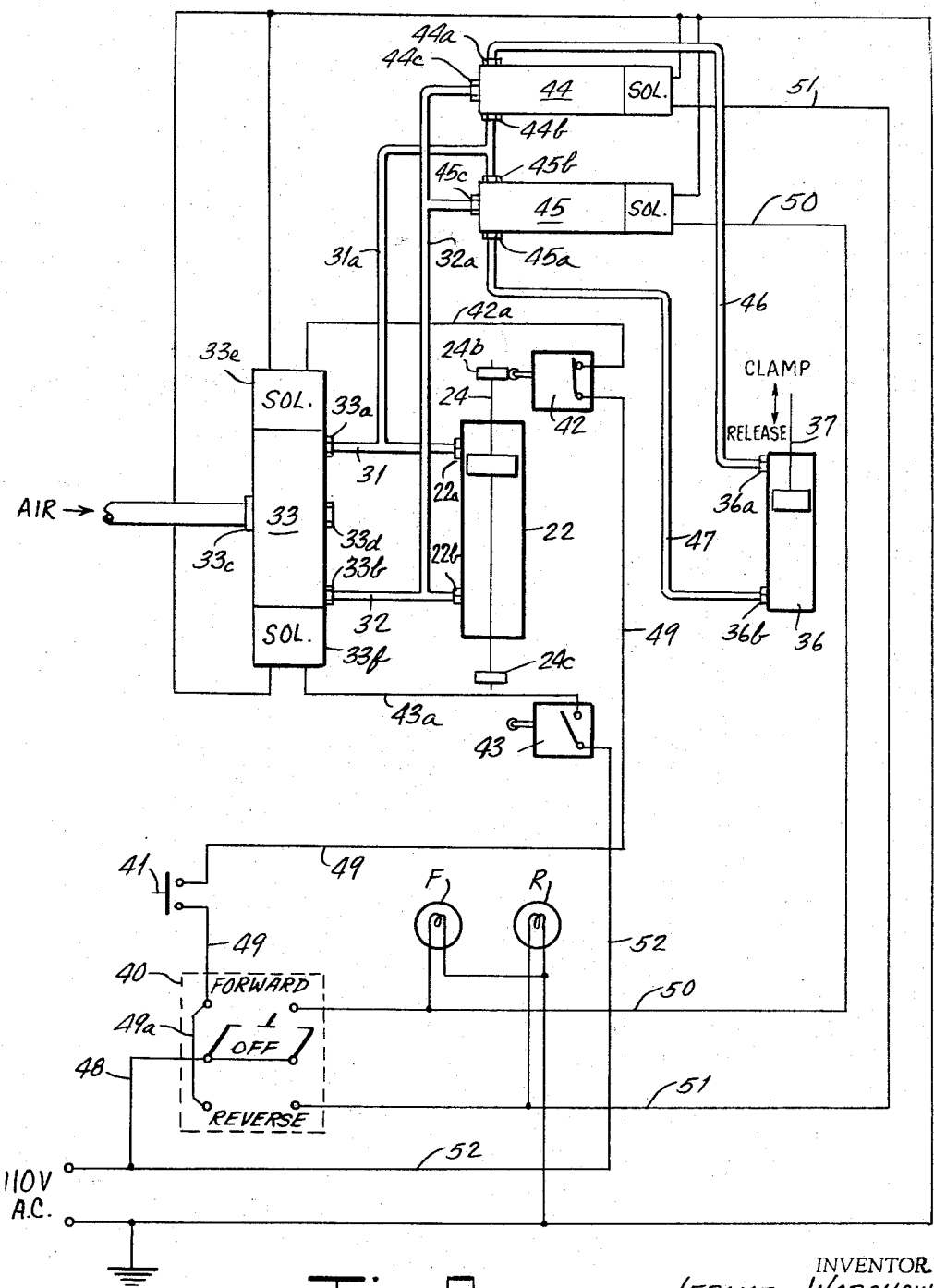
FIG. 9 is a wiring diagram of the electrical system for manual control of the apparatus shown in FIG. 1.

Referring in detail to the drawings, 20 generally denotes an apparatus constructed to embody the invention which may be provided with a suitable housing 21 having a side wall 21a on which master cylinder 22 is mounted by brackets 23.

Master cylinder 22 may be of any conventional construction for compressed air actuation having an upper port 22a and a lower part 22b connected by air hose lines 31 and 32 to left port 33a and right port 33b, respectively, of a solenoid operated reversing control valve 33. The latter may also be of conventional construction having a reciprocatable spool valve (not shown) operated by a pair of opposed solenoids 33e and 33f, solenoid 33e when energized serving to shift the spool valve to connect a center air inlet 33c with air hose line 31 through port 33a and to connect an exhaust port 33d with air hose line 32 through port 33b, solenoid 33f when energized serving to shift the spool valve in an opposite direction to connect inlet 33c with air hose line 32 and exhaust port 33d with air line hose 31. Inlet 33c is connected through air hose line 34 to filter-regulator-lubricator unit 35 and in turn to a compressed air source (not shown). Master cylinder 22 has a double ended piston rod 24 projecting from opposite ends thereof formed with an axial bore 24a through which wire to be fed loosely extends.

When apparatus 20 is utilized for direct threading of electric wiring, a spool of the latter (not shown) may be conveniently mounted to feed into an open lower end of piston rod 24. However, in the illustrated embodiment of the invention a snake or fish means is used for drawing the electric wiring back through the conduit and is shown as wire-fish 30 extending through axial bore 24a from a coiled receptacle 28 positioned beneath cylinder 22 to emerge at the exterior of housing 21 through a nozzle 27. The upper end of piston rod 24 mounts clamping block 25 having a bore 25a in axial alignment with and as an extension of bore 24a. The upper end of clamping block 25 has an extension sleeve 25b telescopingly receiving fixed tube 26a of nozzle mounting 26 which passes wire-fish 30 through the top wall 21b of housing 21. Nozzle mounting 26 supports interchangeable nozzle 27 and provides means for limiting retraction of wire-fish 30 in the manner hereinafter more fully described.

Piston rod 24 also carries tripper collar 24b on its upper end for actuating microswitch 42 when piston rod 24 is in an extreme raised position and carries tripper collar 24c on its lower end for actuating microswitch 43 when piston rod 24 is in an extreme lowered position. The lower end of piston rod 24 has an extension sleeve 29 telescopingly receiving a sleeve portion 28a terminating coiled receptacle 28.

Auxiliary clamping cylinder 36 is suitably mounted in fixed relation to clamping block 25 for movement with the latter and with piston rod 24 as by bracket 39 which is attached to clamping block 25 by bolts 39a. Clamping cylinder 36 has an upper port 36a and a lower port 36b connected by secondary air hose lines 46 and 47 to outlet ports 44a and 45a of solenoid operated valves 44 and 45, respectively. The latter in combination with the electrical components for controlling and operating the solenoids hereinafter described serve as the wire-fish feed direction determining means. Valves 44 and 45 may be of a 3-port type, here illustrated as ports 44a, 44b, 44c and 45a, 45b, 45c, respectively, ports 44a, 44b and 45a, 45b being normally open to permit air flow therethrough when the solenoids are deenergized. Energizing each solenoid causes the respective ports 44b, 45b to close and ports 44c, 45c to open so that the air flow is then by-passed between ports 44a, 44c and 45a, 45c, respectively. For proper operation, as will be hereinafter more fully described, either one of valves 44 or 45 must be energized while the other must be deenergized. As indicated in FIG. 1, ports 44b and 45b are connected in parallel to air hose line 31 by suitable means such as auxiliary air hose lines 31a and T-connections 31b and 31c. Likewise ports 44c and 45c are connected in parallel to air hose line 32 by auxiliary air hose lines 32a and T-connections 32b and 32c.

Clamping cylinder 36 is seen to have a single ended piston rod 37 connected by suitable linkage 37a to an arm 38. As shown in FIGS. 4 and 5, a clamping block 25 has a lateral slot 25d extending parallel to bore 25a communicating the latter with the exterior for accommodating an end of arm 38 which pivots therein on pin 25c. Arm 38 has an edge 38a adapted to clampingly engage and grip wire-fish 30 against the wall of bore 25a when arm 38 is pivoted in a clockwise direction, as seen from FIG. 4, by upward movement of piston rod 37.

For manual control, apparatus 20 may incorporate an electrical system shown in FIG. 9 to utilize a suitable power source, such as 110 volts A.C. A selector switch 40 for the wire-fish feed direction determining means and indicator lamps F and R may be conveniently located on a control panel 21c of top wall 21b. Both center terminals of selector switch 40 are connected together and to one side of the electric power source through lead 48. Selector switch 40 is preferably a double pole double throw switch having a central "off" position and two selective positions, one of which is designated "forward" and the other "reverse." Leaving switch 40 are leads 49, 50 and 51, lead 49 being connected by a jumper 49a to both terminals on the left side of the switch, as seen in FIG. 9, leads 50 and 51 each connected to one of the terminals on the right side of the switch. Thus, the circuit from power lead 48 to leads 49, 50 and 51 is open when switch 40 is in the central "off" position, the circuit is closed to leads 49 and 50 when switch 40 is in "forward" position, the circuit to lead 51 being open, and the circuit is closed to leads 49 and 51 when switch 40 is in "reverse" position, the circuit to lead 50 being open.

Leads 50 and 51 are connected to energize the solenoids of valves 45 and 44 and to light corresponding indicator lamps F and R, respectively. Lead 52 connects one terminal of lower microswitch 43 to the lead 48 side of the power supply by-passing switch 40, and lead 49 connects to one terminal of upper microswitch 42 through normally open starting button 41. Microswitches 42 and 43 close the circuits to energize solenoids 33e and 33f of reversing control valve 33 through leads 42a and 43a, respectively.

Wire-fish 30 mounts on its leading end a suitably shaped and sized guiding head 30a, which is designed for the particular type of conduit to be threaded. In all its forms, guiding head 30a preferably has a portion with an overall diameter larger than the mouth opening in nozzle 27 to prevent its retraction into nozzle 27 and into other parts of the feeding mechanism. In order to prevent application of undue stress and strain on apparatus 20 and the likely breaking of wire-fish 30 should retraction accidentally be attempted beyond the fully retracted position in which guiding head 30a abuts the mouth opening of nozzle 27, a safety limiting means is incorporated in nozzle mounting 26.

As shown in FIGS. 4 and 6, nozzle mounting 26 includes a nipple-like fitting 26b having lower and upper threaded opposite ends 26c and 26d of reduced diameter extending from a hexagonal midportion. Lower threaded end 26c extends through an opening in housing top wall 21b receiving retaining nut 26e to secure mounting 26 in a vertical upstanding position on the exterior of top wall 21b in axial alignment with extension sleeve 25b. Fixed tube 26a, which extends axially downwardly from lower threaded end 26c telescoping into extension sleeve 25b, communicates within fitting 26b with an axially aligned fixed tube 26f of larger diameter extending upwardly from upper threaded end 26d into the core of helical compression spring 26g. A cylindrical housing 26h threads onto upper end 26d of fitting 26b enclosing compression spring 26g and has a collar 26i threaded onto the upper end thereof for removably retaining the interchangeable nozzle 27 thereon.

Nozzle 27 is seen in FIGS. 4 and 6 to comprise a tube 27a extending coaxially through and being fixed to a plunger portion 27b. Tube 27a preferably has an inside diameter slightly larger than the diameter of wire-fish 30 to permit free movement of the latter therethrough but sufficiently snug to prevent undesirable bunching up or kinking. The lower end 27c of tube 27a extends downwardly from plunger portion 27b into the core of compression spring 26g in axial alignment with fixed tube 26f, the latter being sized to telescopingly receive lower end 27c. The upper end of tube 27a will vary in size and configuration in each different nozzle in accordance with its specific requirement to achieve the intended purpose, namely, that of inserting the guiding head 30a of wire-fish 30 into a lamp arm or conduit to clear a sharp bend and directing the feeding of wire-fish 30 at an angle to the path of insertion, as illustrated in FIG. 3. Preferably tube 27a is provided in all variations of nozzle 27 with a crook 27d here shown as a right angle bend of relatively large radius serving as a friction or drag brake on wire-fish 30 in the manner hereinafter more fully described. In order to facilitate the initial directing of wire-fish 30 at an angle to the path of insertion, the delivery end of nozzle 27 has a substantially right angle bend 27e of smaller radius than crook 27d, the tube being miter cut at bend 27e positioning the plane of the mouth opening approximately tangent to the outside diameter of the adjacent leg of the bend. As shown in FIG. 3, the straight portion of tube 27a between crook 27d and bend 27e may carry a split ring stop 27h which is axially adjustable therealong serving as a gauge for the depth of insertion of tube 27a into a lamp arm.

As shown in FIG. 6, plunger portion 27b of nozzle 27 extends through a central opening in collar 26i and has an enlarged stop portion at the lower end thereof which provides an upper shoulder 27f for engaging the interior side of collar 26i and a lower shoulder 27g engaged by the upper end of compression spring 26g. The latter, having its lower end engaging the top of upper threaded end 26d of fitting 26d, normally retains nozzle 27 in a fully extended position with upper shoulder 27f abutting collar 26i.

A form of guiding head 30a is shown in FIGS. 7 and 8 to include a through opening 30b and a pair of forwardly extending grooves 30c on opposite sides leading into opening 30b to provide clearance for the electric wire to be attached through opening 30b. Guiding head 30a may be attached to wire-fish 30 by neck 30d which may be suitably treated, as by reducing its cross-section, to afford greater flexibility than wire-fish 30 permitting guiding head 30a to be readily deflected by contact with the interior contour of the conduit through which it is being fed.

The operation of apparatus 20 by manual control will now be described illustrating the threading of lamp arm 60 shown in FIG. 3 to comprise a relatively straight end portion 60a, an acute angular bend 60b and a curved opposite end portion 60c. At the beginning of a cycle, piston rod 24 is at rest in a raised position as seen in full lines in FIG. 1. Selector switch 40 may be in central "off" position and wire-fish 30 substantially fully retracted. The compressed air path now extends through unit 35 to reversing control valve 33 which is set to direct the air pressure through air hose line 32 to the lower end of master cylinder 22 and to connect air hose line 31 from the upper end of master cylinder 22 with exhaust port 33d. Since neither solenoids of valves 44 and 45 are being energized when selector switch 40 is in "off" position, both ports 44c and 45c are closed and no air pressure can be delivered from auxiliary air hose line 32a beyond either valve 44 and 45. However, both secondary air hose lines 46 and 47 from both ends of clamping cylinder 36 are connected through valves 44 and 45, auxiliary air hose line 31a, and line 31 to exhaust port 33d, completely inactivating clamping cylinder 36.

Selector switch 40 is thrown to "forward" position thereby simultaneously providing power to leads 49 and 50, and through the latter lighting indicator lamp F. Lead 49, however, is interrupted by normally open starting button 41. Lead 50 energizes the solenoid of valve 45 which closes port 45b and opens port 45c to supply air pressure through hose lines 32a and 47 to lower port 36b of clamping cylinder 36 thereby advancing piston 37 and maintaining wire-fish 30 in a clamped condition.

Lamp arm 60 is then placed onto nozzle 26 to abut stop 27h which has been preset to accommodate the length of straight end portion 60a and position guiding head 30a for clearing acute angle bend 60b. Lamp arm 60 is oriented with respect to the mouth opening of nozzle 27 for directing wire-fish 30 into the bore thereof past bend 60b as shown in FIG. 3. Starting button 41 is then manually depressed to close circuit to microswitch 42, the latter, being held in closed position by tripper collar 24b, energizes solenoid 33e to shift the spool valve and supply air pressure to air hose line 31. As will be clear from FIG. 1, as air is supplied to air hose line 31, air also is supplied through branch 31a to valve ports 44b and 45b. Valve port 44b being open while port 45b is closed, air will be supplied to the upper port 36a of clamping cylinder 36 through air hose 46 while lower port 36b is connected to exhaust port 33d through air hose 47, ports 45a, 45c and air hose lines 32a and 32. The air capacity, frictional resistance and load of auxiliary clamping cylinder 36 are designed to be considerably less than those of master cylinder 22 in order that the former is relatively quick acting and completes the retraction of piston rod 37, unclamping wire-fish 30, prior to the retraction of piston rod 24 of the relatively slower acting master cylinder 22 to its lowermost position shown in broken lines in FIG. 1. This downward movement of piston rod 24 is thereby accomplished relative to unclamped wire-fish 30 which remains stationary with respect to nozzle 27.

As piston rod 24 moves downwardly away from its upper most, that is, advanced position, microswitch 42 opens, deenergizing solenoid 33e but having no affect on the position of the spool valve within reversing control valve 33. As piston rod 24 approaches its lowermost, that is, retracted position, lower tripper collar 24c engages microswitch 43 which closes the circuit to solenoid 33f through leads 52 and 43a. The energizing of solenoid 33f shifts the spool valve back to the first position so that air hose line 32 connects to the air source and air hose line 31 connects to exhaust port 33d.

As air is being supplied to air hose line 32, air is simultaneously being supplied to branch 32a and to valve port 45c which is open to connect with secondary air hose line 47 to advance piston rod 37 and clamp wire-fish 30. Again, because of the quick action of auxiliary clamping cylinder 36 with respect to master cylinder 22, the former acts to clamp wire-fish 30 before or simultaneously with the beginning of movement of piston rod 24 in its advancing direction so that clamped wire-fish 30 now moves with piston rod 24 and is propelled through nozzle 27. When piston rod 24 reaches its advanced position, upper tripper collar 24b closes microswitch 42. Since starting button 41 is normally open, solenoid 33e remains deenergized, the spool of valve 33 remains in its position and the cycle is completed with piston rod 24 coming to rest and being retained by air pressure in the advanced position shown in full lines in FIG. 1. Wire-fish 30 will also remain clamped by clamping cylinder 36.

Wire-fish 30 has now been advanced one predetermined increment, namely, the distance through which piston rod 24 reciprocates. A practical increment has been found to be on the order of two inches, it being understood that the increment length depends directly upon the size of the master cylinder, which when relatively long will not only be unwieldy but will materially reduce the feeding precision of wire-fish 30. A relatively smaller increment on the other hand, will result in undesirably slower feeding as well as in an increase in the required number of cycles to accomplish the same amount of feeding materially increasing the wear of the machine. In practice, the operator will hold starting button 41 in a depressed position so that apparatus 20 will continue to feed wire-fish 30 in successive increments through lamp arm 60, guiding head 30a facilitating the passage through the curved end portion 60c. When guiding head 30a emerges from the opposite end of lamp arm 60, starting button 41 is released to bring piston rod 24 to rest as hereinbefore described. The end of the electric wiring for lamp arm 60 is then attached to guiding head 30a, as by threading a stripped end of the wiring through opening 30b and twisting the end onto itself after being positioned in grooves 30c to minimize the obstructive size of the connection.

Retraction of wire-fish 30 to draw the electric wiring back through lamp arm 60 is initiated by throwing selector switch 40 to "reverse" position, opening the circuit to lead 50 and indicator lamp F, deenergizing the solenoid of valve 45 and closing the circuit to lead 51 and indicator lamp R, energizing the solenoid of valve 44. In this condition ports 44b and 45c are closed and ports 44c and 45b are open so that air supplied to air hose line 32 to advance piston rod 24 simultaneously is supplied through ports 44c and 44a to secondary air hose line 46 to retract piston rod 37 and release wire-fish 30 from its clamped condition. Now depressing starting button 41 will commence the retraction cycle by supplying air to hose lines 31 and 31a which in turn, through valve 45 and secondary hose line 47, advances piston rod 37 to clamp wire-fish 30 for retraction as piston rod 24 moves downwardly. On each upward stroke of piston rod 24, piston rod 37 is retracted to release wire-fish 30 as hereinbefore described, air being supplied from air hose lines 32, 32a, through ports 44c and 44a to secondary air hose line 46. The operator may retain starting button 41 in depressed position for successive increments until wire-fish 30 is fully retracted. Preferably, by counting the number of increments required to complete the advancement of wire-fish 30 through lamp arm 60, the operator may retract wire-fish 30 an equivalent number of increments. Selector switch 40 is then returned to "forward" position to clamp wire-fish 30 while lamp arm 60 is being removed from nozzle 27, simultaneously drawing the electric wiring through straight end portion 60a. After disconnecting electric wiring from guiding head 30a, apparatus 20 is in readiness to receive the next lamp arm for threading.

Should starting button 41 be depressed to initiate a retraction cycle after guiding head 30a reaches a fully retracted position, on the retraction stroke of piston rod 24 nozzle 27 will be drawn downwardly a distance equal to one increment by wire-fish 30, as shown in broken lines in FIG. 4, plunger portion 27b telescoping into nozzle mounting 26 and tube lower end 27c telescoping into fixed tube 26f against the action of compression spring 26g. During the upward stroke of piston rod 24, when clamping cylinder 36 releases wire-fish 30, plunger portion 27b is returned to its normal extended position by compression spring 26g pulling wire-fish 30 upwardly one increment to its normal fully retracted position.

It will thus be clear that the coaction of nozzle mounting 26 and the release of wire-fish 30 by clamping cylinder 36 during the upward stroke of piston rod 24 serves to safely return wire-fish 30 to its normal fully retracted position, after each subsequent retraction stroke, avoiding the possibility of guiding head 30a breaking off and wire-fish 30 being retracted beyond reach.

Any friction force tending to carry wire-fish 30 along with piston rod 24 during its return stroke, that is, during the time wire-fish 30 is not positively clamped by clamping cylinder 36, is overcome by the friction or drag brake action of wire-fish 30 against the wall of tube 37a in passing through crook 27d.

While any suitable material conventionally used for threading purposes may be used for fashioning wire-fish 30, for optimum results and to insure relatively long life in use, wire-fish 30 should have sufficient tensile strength to resist elongation when drawing back the electric wiring and relatively low coefficient of friction for smooth advancement and retraction through apparatus 20 and the conduits being threaded, be bendable to easily pass through bend 27e at the mouth of nozzle 27 as well as any sharp bends in the conduit, have sufficient resiliency to avoid kinking when bent and sufficient stiffness to avoid bunching up and twisting during advancement, and proper resiliecy and toughness to avoid notching by repeated clamping in block 25. Wire-fish 30 made of high molecular weight nylon commercially designated "nylon 6" has been found to meet these requirements and render satisfactory results.

The mouth opening in nozzle 27 is illustrated as located to direct wire-fish 30 in a vertically upward direction into lamp arm 60. It is intended that other nozzles of a wide variety of shapes and sizes (not shown), some of which may have their terminals and mouths fashioned to direct wire-fish 30 at a different angle, as for example, horizontally forward, to the right or left or vertically downward, be supplied to replace nozzle 27 where required in the threading of a particular shape and size of lamp arm or other conduit.

To replace nozzle 27, wire-fish 30 is first removed by either advancing the latter to its full extent by operation of apparatus 20 so that the trailing end clears clamping arms 38 and then manually withdrawing wire-fish 30, or by placing selector switch 40 in "reverse" position, freeing wire-fish 30 and then manually withdrawing the latter. Collar 26i is then unthreaded from housing 26h and passed over the end of nozzle 27 to completely free the latter for replacement. After another nozzle is secured in place and selector switch 40 positioned in "reverse," the trailing end of wire-fish 30 is threaded into the mouth of the nozzle and into the feeeding mechanism until it enters clamping block 25 where the remaining retraction can be accomplished by apparatus 20.

For semi-automatic operation, a control circuit shown in FIG. 10 may be utilized which includes rotary selector switch 53, stepping relay 54 and latching relay 55, all of well known conventional construction. Rotary selector switch 53 may be suitably mounted on control panel 21c of housing 21 and is indicated in FIG. 1 as including a dial 53a and control knob 53b. Stepping relay 54 and latching relay 55 may be conveniently positioned in housing 21.

In FIG. 10, the circuit of a semi-automatic control for apparatus 20 is shown as an additional circuit superimposed on and integrated with the basic manual control circuit shown in FIG. 9, corresponding elements common to both circuits being indicated by the same reference numerals. A starting button 41a for initiating semi-automatic operation is shown in parallel with manual control starting button 41 and closes a circuit from lead 49 through lead 56 to circuit closing coil 55a of latching relay 55, coil 55a when energized serving to close switch 55b interposed in circuit 57 which supplies power directly from the supply line to one terminal of upper microswitch 42. Power is also supplied through lead 54a to the rotatable terminal 54b of a rotary switch in stepping relay 54. The fixed terminal positions in the latter may be numbered from "0" to "20," the "0" position being open and positions "1" through "20" each being connected by an intermediate lead 54c to fixed terminal positions "1" to "20," respectively, in rotary selector switch 53. The rotatable terminal 54b to the "0" position. A branch ally by knob 53b is connected through lead 58 to circuit opening coil 55c of latching relay 55, coil 55c when energized, serves to open switch 55b to cut off power through lead 57 to upper microswitch 42. Lead 58 has a parallel branch 58a for supplying power to the reset coil 54d of stepping relay 54, resest coil 54d when energized returns rotatable terminal 54b to the "0" position. A branch lead 43b parallel to lead 43a, connects the output terminal of lower microswitch 43 to supply power to the stepping coil 54e of stepping relay 54, when lower microswitch 43 is closed by lower tripper collar 24c, coil 54e when energized advances the rotatable terminal 54b one step, supplying power to the next fixed terminal and through its intermediate lead 54c to a correspondingly numbered fixed terminal in rotary selector switch 53.

The operation of apparatus 20 by semi-automatic control will now be apparent. The distance required for advancing wire-fish 30 through lamp arm 60 is predetermined and the pointer of knob 53b set to the corresponding increment number on dial 53a. For example, assuming 10 inches is required, each increment of advancement being 2 inches, dial 53a is set at "5," as indicated in FIG. 10. By pressing starting button 41a circuit closing coil 55a is energized through lead 56 closing switch 55b of latching relay 55 thereby supplying power to microswitch 42, since the latter is closed by tripper collar 24b with piston rod 24 being at rest in the extreme raised position, solenoid 33e is energized to shift the spool valve of reversing control valve 33 to supply air pressure to air hose line 31, initiating a cycle. As piston rod 24 approaches its lowermost position, tripper collar 24c closes microswitch 43 and power is simultaneously supplied to solenoid 33f to shift the spool valve and to the stepping coil 54e to advance rotatable terminal 54b of stepping relay 54 from position "0" to position "1," supplying power through intermediate lead 54c to corresponding fixed terminal "1" of rotary selector switch 53, the latter being open. As piston rod returns to its raised position so that tripper collar 24b closes microswitch 42. Latching relay switch 55b still being closed, solenoid 33e is again energized to automatically commence a second cycle. The cycles continue in succession with stepping coil 54e being energized each time microswitch 43 is closed by tripper collar 24c at the end of the downstroke of piston 24, stepping coil 54e when energized serving to advance the rotary terminal 54b to the next consecutive fixed terminal until rotary terminal 54b engages terminal "5." In this position power is now supplied through intermediate lead 54c, fixed terminal "5" of rotary selector switch 53, rotatable terminal 53c and lead 58 to latching relay circuit opening coil 55c which opens switch 55b, opening the circuit through lead 57 to upper microswitch 42. Thus, after piston rod 24 has completed five cycles it comes to rest in its raised extreme position. Simultaneously with the energizing of latching relay circuit opening coil 55c, stepping relay reset coil is energized through lead 58a to reset rotatable terminal 54b at the "0" position. After the end of the electric wiring for lamp arm 60 is attached to guiding head 30a, selector switch 40 is thrown to the "reverse" position and starting button 41a again pressed to automatically retract wire-fish 30 a distance of five increments at which point guiding head 30a is in its full retracted position. Starting button 41 is available for use should one or more increments of advancement be required independently of rotary selector switch 53.

Apparatus 20 may be readily adapted to feed electric wiring directly into a conduit to be threaded when the shape of the conduit and the stiffness and resilient properties of the electric wiring make such direct feed feasible. This is accomplished by replacing coiled receptacle 28 by a mounting means and supply reel for electric wiring, the latter being fed into the lower end of piston rod 24. Where portions of the bore of the feeding mechanism require relatively snug fitting of the wire, as for example, in clamping block 25, such bores may be shaped to conform to the general cross-sectional contour of the electric wiring when the latter is other than circular. The retraction capability by apparatus 20 of the wire being fed will be seen to be useful in the direct threading of electric wiring, as for example, in releasing the latter should it become jammed in the conduit in its advancement.

Reference in the claims to threading or feeding wire is intended in a generic sense to include both the feeding of electric wiring from a supply reel and the feeding of wire-fish 30 from a suitable receptacle such as coiled receptacle 28.

The improved apparatus herein disclosed is seen to achieve the several objects of the invention and to be well adapted to meet conditions of practical use. As various possible embodiments might be made in the above invention, and as various changes might be made in the disclosed construction, it is to be understood that all matters herein set forth or shown in the accompanying drawings are to be interpreted as illustrative and not in a limiting sense.

Having thus described my invention, I claim as new and desire to secure by Letters Patent:

1. A wire threading apparatus of the character described comprising a reciprocatable rod having a bore extending therethrough in alignment with the bore of a nozzle, a conduit positioned to receive a wire extending through said bores and fed from the nozzle, clamping means carried by said rod for gripping said wire for advancement and retraction, means for reciprocating said rod, means for selectively actuating said clamping means for gripping said wire for movement with said rod when the latter is moving in one direction and releasing said wire when said rod is moving in an opposite direction, and means for controlling said actuating means to determine the direction of movement of said wire.

2. The apparatus defined in claim 1 in which said wire receiving conduit has a bend spaced from one end thereof, said nozzle having an elongated delivery end for inserting into said conduit end to reach said bend and a mouth constructed and arranged to direct a leading end of said wire at an angle to said elongated delivery end to clear said conduit bend.

3. A wire threading apparatus of the character described comprising means for selectively feeding a wire in an advancing or retracting direction in relatively small and uniform increments through a length of conduit, control means for said wire feeding means including presettable means for selecting a predetermined number of said increments to correspond to the length of conduit to be traversed by the wire, means for manually selecting said feeding direction, and means for automatically stopping said feeding means at the conclusion of said predetermined number of increments.

4. The wire threading apparatus defined in claim 3, a manual operable means for initiating a single increment movement of said wire independent of said presettable means.

5. A wire threading apparatus of the character described comprising a wire-fish to be advanced and retracted through a conduit having a bend spaced from one end thereof, power actuated reciprocating means, clamping means carried by said reciprocating means for selectively gripping said wire-fish for advancement or retraction by said reciprocating means, a nozzle feeding said wire-fish from said reciprocating and clamping means, said nozzle having an elongated delivery end for inserting into said conduit end to reach said conduit bend and a mouth constructed and arranged to direct a leading end of said wire-fish at an angle to the feeding direction of the latter in passing through said elongated delivery end to clear said conduit bend, said wire-fish advancement or retraction being performed in relatively small increments equivalent to a predetermined travel distance of said reciprocating means, said wire-fish leading end having a larger diameter than the nozzle mouth preventing retraction thereof into the nozzle beyond a fully retracted position, and a resilient mounting into which a portion of said nozzle telescopes a distance equal to said increment from a normal extended position to a retracted position on retraction of said wire-fish by said clamping and reciprocating means beyond said fully retracted position, said resilient mounting returning said nozzle to the normal extended position on release of the clamping means.

6. A wire threading apparatus of the character described comprising a wire-fish to be advanced and retracted through a conduit having a bend spaced from one end thereof, power actuated reciprocating means, clamping means carried by said reciprocating means for selectively gripping said wire-fish for said advancement or retraction by said reciprocating means in relatively small increments equivalent to a predetermined travel distance of said reciprocating means, a nozzle feeding said wire-fish from said reciprocating and clamping means, said nozzle having an elongated delivery end for inserting into said conduit end to reach said conduit bend and a mouth constructed and arranged to direct a leading end of said wire-fish at an angle to the feeding direction of the latter in passing through said elongated delivery end to clear said conduit bend, said nozzle having an end opposite said mouth formed as a plunger, a mounting for said nozzle having a cylinder receiving said plunger for retraction thereinto, a compression spring within said cylinder yieldably retaining the plunger in a normal fully projected position, said wire-fish leading end having a larger diameter than the nozzle mouth preventing retraction thereof into the nozzle beyond a fully retracted position, said plunger being retracted into said cylinder against the action of the compression spring on retraction of said wire-fish by said clamping and reciprocating means beyond said fully retracted position, said spring returning said plunger to the normal projected position on release of the clamping means.

7. The wire threading apparatus defined in claim 6 in which said nozzle is interchangeably retained on said mounting cylinder by a removable collar through which said plunger extends.

8. A wire threading apparatus of the character described comprising a mechanism for feeding a wire through a nozzle into a conduit to be wired, said feeding mechanism including an air pressure actuated master cylinder having a double ended piston rod formed with a bore through which said wire extends, means for clamping the wire for movement with the piston rod, said clamping means having an actuating air cylinder, first and second air hose lines from a compressed air source connected to the master cylinder for moving the piston rod in wire retracting and advancing directions, each air hose line having a branch to the clamping means actuating cylinder for clamping and releasing the wire, a reversing control valve interposed in the first and second air hose lines for selectively supplying air pressure to either one of said lines and connecting the other to an exhaust, and control valve means interconnecting said branches to selectively supply air pressure from either of said air hose lines to either of said branches for selectively clamping said wire on movement of the piston rod in either direction and releasing the wire on movement of the piston rod in the opposite direction to advance or retract the wire through said nozzle in increments equivalent to the travel distance of the piston rod.

9. The apparatus defined in claim 8 in which said feeding mechanism includes control means actuating said reversing control valve to automatically return said piston rod to an extreme advanced rest position to complete a cycle, said control means including manual operable means to actuate said reversing control valve for initiating a cycle.

10. The apparatus defined in claim 8 in which said feeding mechanism includes a first means responsive to an electric impulse for actuating said reversing control valve, an electric circuit for supplying said impulse to the responsive means including switches operable by said piston rod at the end of travel in each direction for energizing said first responsive means to actuate said reversing control valve, a manual normally open switch interposed in the circuit to one of said switches to automatically bring said piston rod to rest at one end of travel completing a cycle for moving the wire one increment and initiating the next cycle by manual closing of said switch.

11. The apparatus defined in claim 10 in which said feeding mechanism includes a second means responsive to electric impulse for actuating said control valve means, an electric circuit for supplying said impulse to the second responsive means including a manually operable multi-position switch for selectively energizing said second responsive means to manually control the direction of feeding of said wire.

12. The appartaus defined in claim 8 in which said feeding mechanism includes a first means responsive to an electric impulse for actuating said reversing control valve, an electric circuit for supplying said impulse to the responsive means including a pair of switches, one switch operable by said piston rod at the end of travel in each direction for energizing said first responsive means to actuate said reversing control valve, a third switch interposed in the circuit to one of said pair of switches for opening the circuit to automatically bring said piston rod to rest at one end of travel completing a cycle for moving the wire one increment and for closing the circuit to initiate the next cycle, a latching relay for operating said third switch, a stepping relay actuating the latching relay to open said third switch, and a rotary selector switch coacting with said stepping relay for selecting a predetermined number of increments for automatic advancement or retraction of the wire by said feeding mechanism, the other of said pair of switches energizing said stepping relay to advance one position on each closure by said piston rod, said latching relay, stepping relay and selector switch being constructed and arranged to energize said latching relay to open said third switch to bring said piston rod to rest at the completion of the last of the predetermined number of increments indicated by said rotary selector switch.

13. A wire threading apparatus of the character described comprising a wire-fish having a leading end for advancing through a length of conduit to be connected to wiring and for retracting the wire-fish to draw the wiring back through the conduit, means for selectively feeding said wire-fish in an advancing or retracting direction in relatively small and uniform increments, control means for said wire-fish feeding means including presettable means for selecting a predetermined number of said increments to correspond to the length of conduit to be traversed by the wire-fish, means for manually selecting said feeding direction, and means for automatically stopping said feeding means at the conclusion of said predetermined number of increments.

14. The wire threading apparatus defined in claim 13 in which said feeding means includes a power operated reciprocating means having a travel distance substantially equal to the length of said increments.

15. The wire threading apparatus defined in claim 13, a manual operable means for initiating a single increment movement of said wire-fish independent of said presettable means.

16. A wire threading apparatus of the character described comprising a wire-fish to be advanced and retracted through a conduit, power actuated reciprocating means, clamping means carried by said reciprocating means for gripping said wire-fish for said advancement and retraction by said reciprocating means, means for selectively actuating said clamping means for gripping said wire-fish for movement therewith when said reciprocating means is moving in one direction and releasing said wire-fish when said reciprocating means is moving in an opposite direction, and means for controlling said actuating means to determine the direction of movement of said wire-fish.

17. A wire threading apparatus of the character described comprising a wire-fish to be threaded through a conduit, a nozzle having a delivery end and mouth for inserting into an end of said conduit, means for selectively feeding said wire-fish through said nozzle in an advancing and retracting direction in predetermined relatively small and uniform increments, said wire-fish leading end having a larger diameter than the nozzle mouth preventing retraction thereof into the nozzle beyond a fully retracted position, and a resilient mounting into which a portion of said nozzle telescopes a distance equal to said increment from a normal extended position to a retracted position on retraction of said wire-fish beyond said fully retracted position, said resilient mounting returning said nozzle to the normal extended position between feeding increments to prevent breaking of the wire-fish.

18. A wire threading apparatus of the character described comprising a wire-fish to be advanced and retracted through a conduit, power actuated reciprocating means, clamping means carried by said reciprocating means for selectively gripping said wire-fish for said advancement or retraction by said reciprocating means in relatively small increments equivalent to a predetermined travel distance of said reciprocating means, a nozzle feeding said wire-fish from said reciprocating and clamping means having a mouth for inserting into an end of said conduit and an end opposite the mouth formed as a plunger, a mounting for said nozzle having a cylinder receiving said plunger for retraction thereinto, compression means within said cylinder yieldably retaining the plunger in a normal fully projected position, said wire-fish having a leading end of larger diameter than the nozzle mouth preventing retraction thereof into the nozzle beyond a fully retracted position said plunger being retracted into said cylinder against the action of the compression means on retraction of said wire-fish by said reciprocating and clamping means beyond said fully retracted position, said compression means returning said plunger and wire-fish to the normal projected position on release of the clamping means.

19. A wire threading apparatus of the character described comprising a length of wire-fish of uniform cross-section formed of high molecular weight nylon terminating in a guiding head of larger cross-section having wire attachment means, a storing receptacle and a nozzle interconnected by a feeding mechanism for advancing the wire-fish from the receptacle through the nozzle for threading through a length of conduit to be wired for attachment of wiring to said guiding head attachment means and for retracting the wire-fish to draw the wiring back through the conduit, control means for said wire-fish feeding mechanism including presettable means for predetermining the distance of advancement to correspond to the length of the conduit to be traversed by the wire-fish and insuring retraction of the latter an equivalent distance, and means for automatically stopping said feeding mechanism at the end of said advancement.

20. A wire threading apparatus of the character described comprising a wire-fish of uniform cross-section formed of high molecular weight nylon terminating in a guiding head of larger cross-section for advancing through a length of conduit, said guiding head having a through opening to be connected to wiring and on retraction of the wire-fish to draw the wiring back through the conduit, means for selectively feeding said wire-fish in an advancing or retracting direction in relatively small and uniform increments, control means for said wire-fish feeding means including presettable means for selecting a predetermined number of said increments to correspond to the length of conduit to be traversed by the wire-fish, means for manually selecting said feeding direction, and means for automatically stopping said feeding means at the conclusion of said predetermined number of increments.

21. The wire threading apparatus defined in claim 20 in which said feeding means includes a hydraulic powered reciprocating means having a travel distance substantially equal to the length of said increment, and a hydraulic powered clamping means carried by said reciprocating means for gripping said wire-fish for said advancement and retraction by said reciprocating means.

22. An apparatus of the character described for threading wire through a conduit having a bend spaced from one end thereof, comprising a passageway through which said wire is propelled, means associated with said passageway for propelling said wire therethrough in an advancing direction, a nozzle having an elongated delivery end portion for inserting into said conduit end to reach said conduit bend, a mouth terminating said delivery end portion, means mounting said nozzle at the delivery end of said passageway to receive said propelled wire from said passageway for delivery into said conduit bend through said mouth, the latter being constructed and arranged to direct a leading end of said wire at an angle to the advancing direction of the wire passing through said elongated delivery end portion to clear said conduit bend.

23. The apparatus defined in claim 22, including adjustable stop means associated with said nozzle delivery end portion for engaging said conduit end to control the distance of insertion of the nozzle and locate said mouth in bend passing relation.

24. The apparatus defined in claim 22, in which said nozzle mounting means permits ready removal and replacement of the nozzle with other nozzles having mouths constructed and arranged to direct said leading end of the wire at different angles and in different directions with respect to said elongated delivery end portion.

25. The apparatus defined in claim 22, in which said mouth is located adjacent a relatively small radius bend, the nozzle end being miter cut close to said bend to position the mouth approximately tangent to the outside diameter of the adjacent elongated delivery end portion.

References Cited by the Examiner
UNITED STATES PATENTS

| | | | |
|---|---|---|---|
| 2,750,152 | 6/1956 | Schinske | 254—134.3 |
| 2,946,560 | 7/1960 | Ferm | 254—134.3 |
| 3,145,972 | 8/1964 | Sweeney | 254—134.3 |
| 3,172,297 | 3/1965 | Thiene | 226—139 X |

M. HENSON WOOD, Jr., *Primary Examiner.*

R. A. SCHACHER, *Assistant Examiner.*